Nov. 18, 1958   G. RUBNER   2,861,009
PROCESS OF DECORATING A SHEET
Filed Feb. 19, 1954
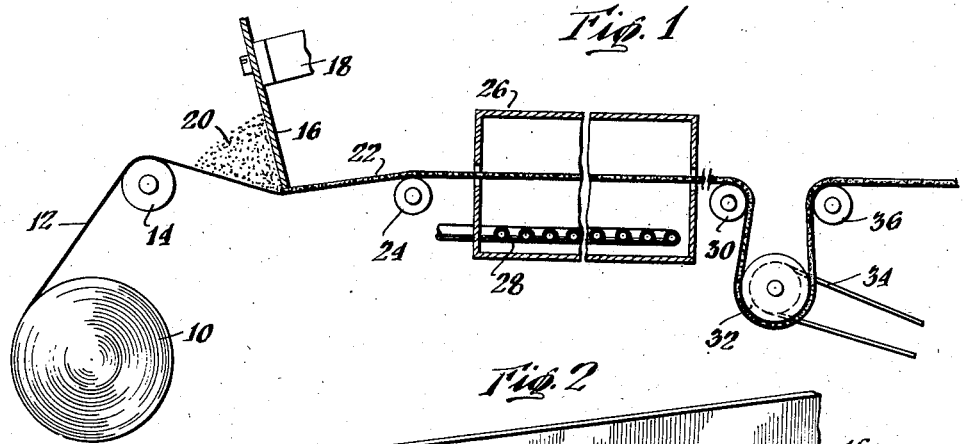
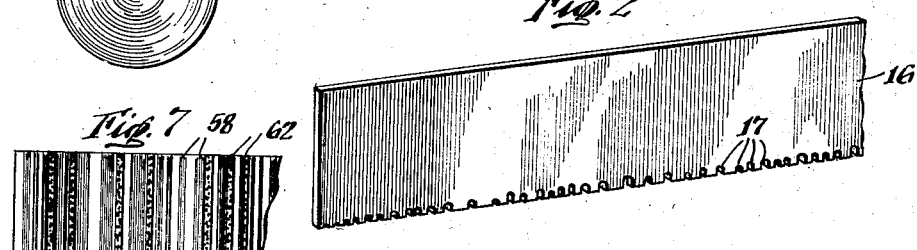
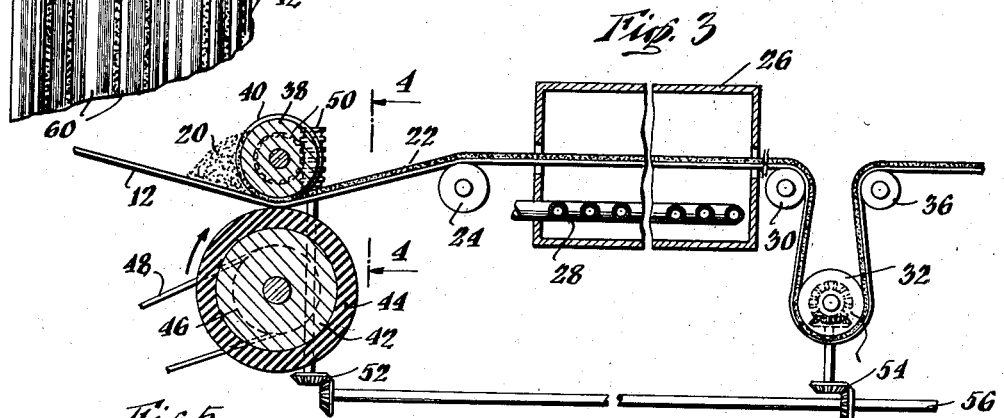
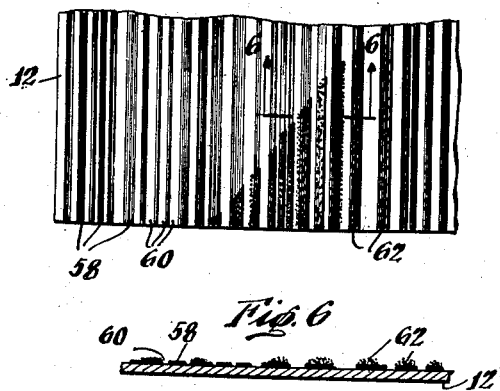
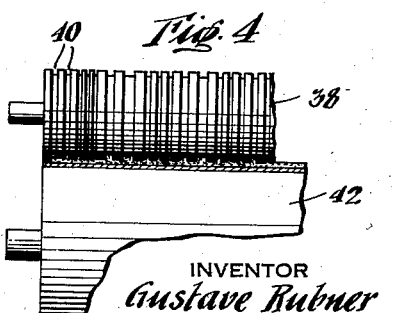
INVENTOR
Gustave Rubner
BY
Robert Calvert
ATTORNEY

United States Patent Office 2,861,009
Patented Nov. 18, 1958

2,861,009

PROCESS OF DECORATING A SHEET

Gustave Rubner, White Plains, N. Y.; Rebecca Rubner and Chemical Corn Exchange Bank, executors of said Gustave Rubner, deceased Application February 19, 1954, Serial No. 411,420

1 Claim. (Cl. 117—41)

This invention relates to decorated sheets and the machine and process for use in the manufacture thereof.

The invention is particularly useful in making a decorative paper with an irregular surface and will be first illustrated, therefore, by description in connection with such paper.

Briefly stated the invention comprises the herein described process and machine for spreading spaced strips of plastic on a base, heating the strips of plastic so applied, and then cooling the product. In my commercial operation, the invention comprises applying spaced masses of plastic in the form of an aqueous dispersion and then evaporating the water rapidly by subjecting the whole to a temperature well above the boiling point of water, the rapid evaporation of the water so produced causing miniature eruptions shown by the resulting roughened steam escape areas. These roughened areas improve the appearance of the finished product.

In one embodiment, penetrable base material such as paper is first printed with spaced bands of coloring material of uneven spacing apart, the bands after application being themselves penetrable to the said plastic material so that plastic resting on the bands becomes adhered thereover.

The invention includes also the herein described decorative product.

The invention will be further illustrated by description in connection with the attached drawings to which reference is made.

Fig. 1 is a side elevation, partly diagrammatic and partly in section, of the machine used in making my product.

Fig. 2 is a perspective view of the doctor blade of Fig. 1.

Fig. 3 is a side sectional view, partly diagrammatic, of a modified form of my apparatus.

Fig. 4 is a view on section line 4—4 in the direction of the arrows.

Figs. 5 and 7 are plan views of my finished product, Fig. 5 being partly broken away for clearness of illustration.

Fig. 6 is a sectional view on line 6—6 of Fig. 5.

There is shown a roll 10 of paper to be printed with whip 12 passing over guide roller 14 under doctor blade 16 supported by conventional means illustrated in part at 18 and holding a bank or supply 20 of plastic composition in flowable form, in advance of the doctor blade and on the sheet which is to be decorated.

The plastic applied through the notches 17 of the doctor blade is shown at 22.

The sheet with the applied plastic composition passes over guide roller 24 through heating chamber 26 provided with heater 28 and then to the outside air where the product is cooled. The product is then passed over guide rollers 30, 32, and 34 to the winding up mechanism (not shown), roller 32 being driven by conventional means including belt 34. This driven roller serves to draw the sheet material through the mechanism described and to hold it in tight, conforming contact against the unnotched portions of the lower edge of the doctor blade 16.

In the embodiment shown in Fig. 3 which I have found to be particularly satisfactory, the doctor blade is substituted by a doctor roller 38 provided with grooves 40. The sheet 12 being processed is pressed upwardly, in firm and conforming contact to the unnotched portions of the roller, by the resilient pressure of a facing 44 of rubber or the like on the lower roller 42, this roller being driven by belt 48 acting on pulley 46.

The doctor roller 38 is rotated in counter clockwise direction very slowly, as at the rate of 1 turn in about 4 hours or longer. This rotation is effected by the gearing to roller 32 as shown in Fig. 3, the mechanism including the gear members 50, 52 and 54 which drive shaft 56.

The paper 10 as fed to either of the machines described is preprinted with the color bands 58 leaving intervening spaces 60. The strips of plastic material controlled as to thickness, width and distance and spacing apart by the doctor members described are disposed at random with respect to the said color bands. Thus, the strips of plastic material cover some of the color bands, overlap others or may come between the bands of preprinted color. Also, the strips vary in thickness, width, and spacing. The random and non-mathematical arrangement adds to the decorative effect of the whole.

During the operation described, the original flowable plastic 20 is heated in the chamber 26 and becomes adhered to the preprinted sheet material and anchored in the face thereof.

Parts not illustrated are conventional. The materials of construction of the various parts are those that are common in the construction of similar parts in allied types of equipment. Thus, the doctor blade and roller are suitably of rigid metal of which steel, bronze, and stainless steel are examples.

As to materials, the penetrable base material may be paper, cloth, felt, glass wool, fabric or the like, the term cloth as used including synthetic fabrics such as those of nylon, polyacrylonitrile, or polyester fibers, either alone or mixed with each other or with cotton, wool, or rayon.

The colored bands which are printed on the sheet material may be of conventional kind of printing ink and selected to preserve the penetrability of the printed bands, the intervening parts of the original fabric obviously remaining unaffected by the printing. The colored bands, like so much ink printed on paper, lie within the penetrable base material and extend only to a face thereof. The printed color is suitably either harmonious or contrasting, as in complimentary manner, with the elevated strips that are applied later and that penetrate the face of the base sheet material both at the positions of the colored bands and between the bands.

The plastic strips or ridges are composed of plastic compositions that are somewhat bendable and non-tacky at ordinary temperatures encountered during use of the product.

Examples of plastic that I use are polyvinyl acetate; polyvinyl chloride, its copolymers with vinyl acetate and styrene; the corresponding polymer and copolymer using vinylidene chloride instead of vinyl chloride; cellulose acetate; polymethylmethacrylate; and polyvinyl butyral.

The plastic includes also a plasticizer in amount required, if any to make the whole plastic composition bendable without rupture when cold. The plasticizer, however, should not be of such kind or used in such amount as to make the plasticized, finished cooled plastic tacky at room temperature. Examples of plasticizers that may be used are dioctyl phthalate, butylcresyl phosphate, tributoxyethyl phosphate, and didodecyl sebacate, the plasticizer selected being one that is conventional for the particular resin used in the plastic composition.

The plastic composition also includes fillers and colors, if any, required to establish the desired body and appearance of the product. Among the fillers that I use to advantage are clay, ground mica, diatomaceous earth, and wood flour. Among the coloring materials that I may use are the light fast colors, such as titanium oxide, ochre, lead chromate, and carbon black.

Proportions are variable in accordance with known practice in the art of plastics. Suitable proportions are illustrated in the examples later herein.

The whole plastic composition, including the resin, plasticizer, filler, and pigments is used in the flowable form of a dispersion.

In making my new product the sheet material to be coated is suitably one that has been previously printed as with the colored bands illustrated. The plastic composition of selected kind and in flowable form is applied to the base sheet, as a supply or bank on the sheet just in advance of the doctor member, either the blade shown in Fig. 1 or the roller of Fig. 3.

The sheet material with the colored bands up is then drawn, by the roller 32, tautly under the doctor member. This contact prevents lateral spreading of the plastic to be applied. Spaced ridges or strips 22 or 62 of the plastic composition are drawn through the notches in the doctor member.

Then the base material with the applied strips of plastic are drawn through the heater. Here the whole is heated briefly at about 250°–350° F., so that the dispersion is dried rapidly, surface roughness is developed, and the plastic adheres to the base material being decorated. The adherence is improved by limited penetration of the plastic into the base sheet, so as to become footed in the base material. It is important for this reason that the color bands applied to the penetrable sheet material, before the application of the strips or ridges of plastic, are themselves penetrable.

By the irregular spacing of the preprinted colored bands and of the plastic strips, I make certain that no sidewise shifting of the printed paper or the like, with respect to notches of the doctor member, will result in obliteration of all the printed bands. The result is a pleasing harmony of those of the printed color bands that remain uncovered and the applied plastic strips, aided by the more or less random and non-mathematical relation of the bands to the strips.

When the doctor blade 16 is used, the notches eventually become fouled or blocked with the plastic and require cleaning. When long runs are to be made, I substitute the doctor blade by the doctor roller 38 with the circumferential grooves of varying width and depth and varying spacing from each other. This doctor roller is rotated at such speed as to provide fresh portions of the grooves for passing the flowable plastic material before the notches become blocked or badly fouled with the plastic. I find it good practice to gear the doctor roller to the driving mechanism for the base material being decorated, in such ratio that the doctor roller makes a revolution of 360° in a period of 2–8 hours, ordinarily about 4 hours. After each revolution, the roller is removed and cleaned so that the grooves are restored to their original open condition.

The invention will be further illustrated by description in connection with the following specific examples of the practice of it, proportions being expressed by weight.

Example 1

A white kraft paper is first printed in two colors. One color covers the sheet completely. The second color forms narrow parallel bands spaced at varying distances apart. The paper then is transferred to the coating machine.

The sheet is threaded between the grooved metal doctor roller 38 and the rubber surfaced roller 42, pulled through the machine including the heating cabinet, and attached to a usual rewinding mechanism (not shown).

The paper is now ready to receive the plastic strips. The grooved metal roller is then adjusted to press slightly against the paper supported from below by the rubber faced roller. A supply of flowable plastic is then poured in front of this doctor roller on top of the paper and renewed as necessary.

This plastic is a mixture of plasticized polyvinyl acetate, inert fillers, and pigments, all dispersed in water in amount to give a viscous but flowable mass. The plasticizer is tricresyl phosphate in the proportion of 10 parts for 100 parts of total solids content.

The pulling roller 32 and the rubber roller are then driven at approximately the same surface speed, thereby drawing the flowable plastic onto the paper through the grooves in the doctor member.

The paper then enters the drying cabinet maintained at the temperature of 300° F. The dried product passes to the outside air, where the product is cooled and rewound into a roll (not shown) for shipping.

Example 2

The procedure of Example 1 is followed except that I substitute, for the polyvinyl acetate, any of the other plastic compositions described earlier herein or a mixture of two or more of them.

Example 3

Instead of the round striating bar such as the doctor roller 38, a doctor knife into which notches have been cut is introduced into the machine. No rubber roller is used under the paper in this case, since the paper is pulled taut against the unnotched portions of the lower edge of the knife and draws the flowable plastic through the comb-like doctor blade.

Example 4

The procedure of any of the Examples 1–3 above is followed with the substitution of the kraft paper by any one of the other continuous web materials described herein, including fabrics and felts.

Example 5

The procedure of any of the above Examples 1–4 is followed with the substitution of the emulsion in bank 20 by a plastic composition in flowable powder form such as known in the trade as plastisol. In this instance, the plasticizer and resinous material are mechanically mixed. When this flowable powder mixture has been applied in the form of the spaced strips to the sheet material and the sheet material and applied strips drawn through the heating chamber 26 at about 300° F., the elevated temperature casues fusion and solution of the resin in the admixed plasticizer. The strips so fused, when cooled, adhere to the sheet base material.

There is a special advantage however in the process of Examples 1–4 over that of Example 5. In the heating chamber, water is evaporated during the heating step of Examples 1–4. The resulting rapid generation and escape of steam causes miniature eruptions in the plastic strips, as shown by the production of a roughened surface which is highly desirable in giving textured decorative effects in the finished product. The steam is generated as bubbles within the plastic. As a result, the plastic remains united to the base material even at positions below the positions of generation of the bubbles or steam escape areas, i. e. continuously over the entire width of the strip of plastic.

It will be understood that it is intended to cover all changes and modifications of the examples of the invention herein chosen for the purpose of illustration which do not constitute departures from the spirit and scope of the invention.

What I claim is:

The process of decorating a sheet having a penetrable face which comprises applying an aqueous dispersion of plastic, containing water as the sole gas-forming agent, to the said face so that the plastic penetrates into the face portion of the sheet and becomes anchored therein and subjecting the thus treated sheet to a temperature substantially above the boiling point of water, so as to cause dry and rapid generation and escape of steam and resultant roughness of surface of the plastic.

References Cited in the file of this patent

UNITED STATES PATENTS

| | | |
|---|---|---|
| 299,732 | Buchanan | June 3, 1884 |
| 353,777 | Buchanan | Dec. 7, 1886 |
| 375,233 | Videto | Dec. 20, 1887 |
| 1,922,548 | Mattin | Aug. 15, 1933 |
| 2,066,780 | Holt | Jan. 5, 1937 |
| 2,089,525 | Abrams | Aug. 10, 1937 |
| 2,579,044 | Kober | Dec. 18, 1951 |

OTHER REFERENCES

Chemical Eng., vol. 59; No. 12, December 1952, pages 232 and 234. (Copy in 117—P. O. A.)

Ellis: "Printing Inks," 1940, pages 397 and 398. (Copy in Div. 67.)

UNITED STATES PATENT OFFICE

CERTIFICATE OF CORRECTION

Patent No. 2,861,009                                                    November 18, 1958

Gustave Rubner

It is hereby certified that error appears in the printed specification of the above numbered patent requiring correction and that the said Letters Patent should read as corrected below.

Column 4, line 62, for "casues" read -- causes --; column 5, line 16, for "dry" read -- drying --; column 6, line 9, list of references cited, under the heading "UNITED STATES PATENTS", for "2,089,525      Abrams -------- Aug. 10, 1937
                               read
     -- 2,089,525      Abrams et al.-- Aug. 10, 1937

Signed and sealed this 10th day of March 1959.

(SEAL)
Attest:

KARL H. AXLINE                                                 ROBERT C. WATSON
Attesting Officer                                             Commissioner of Patents